US011113188B2

(12) United States Patent
Bulusu et al.

(10) Patent No.: US 11,113,188 B2
(45) Date of Patent: Sep. 7, 2021

(54) DATA PRESERVATION USING MEMORY APERTURE FLUSH ORDER

(71) Applicant: Microsoft Technology Licensing, LLC, Redmond, WA (US)

(72) Inventors: Mallik Bulusu, Bellevue, WA (US); Tom L. Nguyen, Auburn, WA (US); Neeraj Ladkani, Bothell, WA (US); Ravi Mysore Shantamurthy, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/546,337

(22) Filed: Aug. 21, 2019

(65) Prior Publication Data
US 2021/0056016 A1    Feb. 25, 2021

(51) Int. Cl.
*G06F 12/02*    (2006.01)
*G06F 3/06*    (2006.01)
(Continued)

(52) U.S. Cl.
CPC ............ *G06F 12/023* (2013.01); *G06F 3/064* (2013.01); *G06F 3/0619* (2013.01);
(Continued)

(58) Field of Classification Search
CPC .... G06F 3/0604; G06F 3/0673; G06F 3/0619; G06F 12/023; G06F 3/064; G06F 3/0644; G06F 9/45533; G06F 9/5016
(Continued)

(56) References Cited

U.S. PATENT DOCUMENTS 8,392,662 B2    3/2013 Jang et al.
9,886,194 B2    2/2018 Zheng et al.
(Continued)

OTHER PUBLICATIONS

Kim, et al., "ZonFS: A Storage Class Memory File System with Memory Zone Partitioning on Linux", In Proceedings of IEEE 2nd International Workshops on Foundations and Applications of Self Systems, Sep. 18, 2017, pp. 277-282; retrieved from <<https://www.researchgate.net/publication/320368246_ZonFS_A_Storage_Class_Memory_File_System_with_Memory_Zone_Partitioning_on_Linux/link/5cacafb9299bf193bc2c1fef/download>>.
(Continued)

*Primary Examiner* — Hua J Song
(74) *Attorney, Agent, or Firm* — Ogilvie Law Firm

(57) ABSTRACT

Combined operational steps and device characteristics help preserve data against integrity threats. Data is divided into critical data and non-critical data, based on criteria such as customer requirements, workload criticality, or virtual machine criticality. Data may be generated in a compute node for storage in a storage node, for example. Critical data is stored in a battery-backed memory aperture at physical addresses where it will be flushed ahead of the non-critical data due to a flush order imposed by or on the battery-backed memory, e.g., a bottom-up NVDIMM flush order. Redundant copies of the data (especially non-critical data) may also be kept in case it does not get flushed in time. Battery-backed memory apertures are sized and located according to their battery's characteristics, and may be relocated or resized as conditions change. Flush defragging is performed to optimize use of the aperture, especially within the portion that holds critical data.

20 Claims, 5 Drawing Sheets

(51) Int. Cl.
*G06F 9/455* (2018.01)
*G06F 9/50* (2006.01)

(52) U.S. Cl.
CPC .......... *G06F 3/0622* (2013.01); *G06F 3/0644* (2013.01); *G06F 3/0673* (2013.01); *G06F 9/45533* (2013.01); *G06F 9/5016* (2013.01)

(58) Field of Classification Search
USPC ........................................................ 711/154
See application file for complete search history.

(56) References Cited

U.S. PATENT DOCUMENTS

| | | | |
|---|---|---|---|
| 10,126,950 B2 | 11/2018 | Kirvan et al. | |
| 10,657,052 B2* | 5/2020 | Ponnuru ............. | G06F 12/0891 |
| 2002/0144050 A1 | 10/2002 | Zimmer et al. | |
| 2003/0028697 A1 | 2/2003 | Nguyen | |
| 2003/0070115 A1 | 4/2003 | Nguyen et al. | |
| 2003/0079138 A1 | 4/2003 | Nguyen et al. | |
| 2003/0188173 A1 | 10/2003 | Zimmer et al. | |
| 2004/0034764 A1 | 2/2004 | Bulusu et al. | |
| 2004/0193863 A1 | 9/2004 | Zimmer et al. | |
| 2004/0193865 A1 | 9/2004 | Nguyen et al. | |
| 2004/0210698 A1 | 10/2004 | Nguyen | |
| 2004/0236936 A1 | 11/2004 | Bulusu et al. | |
| 2004/0249992 A1 | 12/2004 | Komarla et al. | |
| 2004/0260936 A1 | 12/2004 | Hiray et al. | |
| 2004/0268140 A1 | 12/2004 | Zimmer et al. | |
| 2005/0028000 A1 | 2/2005 | Bulusu et al. | |
| 2005/0081048 A1 | 4/2005 | Komarla et al. | |
| 2005/0081212 A1 | 4/2005 | Goud et al. | |
| 2005/0240669 A1 | 10/2005 | Khanna et al. | |
| 2006/0015668 A1 | 1/2006 | Nguyen et al. | |
| 2006/0129795 A1 | 6/2006 | Bulusu et al. | |
| 2006/0149913 A1 | 7/2006 | Rothman et al. | |
| 2006/0168590 A1 | 7/2006 | Khanna et al. | |
| 2006/0242399 A1 | 10/2006 | Zimmer et al. | |
| 2006/0288197 A1 | 12/2006 | Swanson et al. | |
| 2007/0006048 A1 | 1/2007 | Zimmer et al. | |
| 2007/0074053 A1 | 3/2007 | Bulusu et al. | |
| 2007/0157015 A1 | 7/2007 | Swanson et al. | |
| 2007/0234029 A1 | 10/2007 | Rothman et al. | |
| 2007/0234077 A1 | 10/2007 | Rothman et al. | |
| 2007/0300007 A1 | 12/2007 | Bulusu et al. | |
| 2008/0120485 A1 | 5/2008 | Rothman et al. | |
| 2008/0126650 A1 | 5/2008 | Swanson et al. | |
| 2008/0141077 A1 | 6/2008 | Swanson et al. | |
| 2008/0155277 A1 | 6/2008 | Bulusu et al. | |
| 2008/0189452 A1 | 8/2008 | Merry et al. | |
| 2008/0244250 A1 | 10/2008 | Swanson et al. | |
| 2009/0006837 A1 | 1/2009 | Rothman et al. | |
| 2009/0023414 A1 | 1/2009 | Zimmer et al. | |
| 2009/0063836 A1 | 3/2009 | Rothman et al. | |
| 2009/0064274 A1 | 3/2009 | Zimmer et al. | |
| 2009/0164837 A1 | 6/2009 | Swanson et al. | |
| 2009/0172381 A1 | 7/2009 | Zimmer et al. | |
| 2009/0254760 A1 | 10/2009 | Komarla et al. | |
| 2011/0154103 A1 | 6/2011 | Bulusu et al. | |
| 2011/0161726 A1 | 6/2011 | Swanson et al. | |
| 2011/0246597 A1 | 10/2011 | Swanson et al. | |
| 2011/0307712 A1 | 12/2011 | Sakthikumar et al. | |
| 2011/0314298 A1 | 12/2011 | Zimmer et al. | |
| 2012/0023364 A1 | 1/2012 | Swanson et al. | |
| 2012/0025953 A1 | 2/2012 | Swanson et al. | |
| 2012/0036308 A1 | 2/2012 | Swanson et al. | |
| 2012/0036347 A1 | 2/2012 | Swanson et al. | |
| 2012/0079085 A1 | 3/2012 | Swanson et al. | |
| 2012/0079316 A1 | 3/2012 | Bulusu et al. | |
| 2012/0084552 A1 | 4/2012 | Sakthikumar et al. | |
| 2012/0159136 A1 | 6/2012 | Rothman et al. | |
| 2012/0166840 A1 | 6/2012 | Rothman et al. | |
| 2013/0031322 A1 | 1/2013 | Bulusu et al. | |
| 2013/0210483 A1 | 8/2013 | Zimmer et al. | |
| 2013/0218551 A1 | 8/2013 | Sakthikumar et al. | |
| 2013/0318577 A1 | 11/2013 | Bulusu et al. | |
| 2013/0325738 A1 | 12/2013 | Swanson et al. | |
| 2014/0006764 A1 | 1/2014 | Swanson et al. | |
| 2014/0025941 A1 | 1/2014 | Bulusu et al. | |
| 2014/0068275 A1 | 3/2014 | Swanson et al. | |
| 2014/0164827 A1 | 6/2014 | Swanson et al. | |
| 2014/0281637 A1 | 9/2014 | Bahnsen et al. | |
| 2015/0006962 A1 | 1/2015 | Swanson et al. | |
| 2015/0012385 A1 | 1/2015 | Bahnsen et al. | |
| 2015/0052389 A1 | 2/2015 | Swanson et al. | |
| 2015/0067163 A1 | 3/2015 | Bahnsen et al. | |
| 2015/0106410 A1 | 4/2015 | Zaltsman et al. | |
| 2015/0277937 A1 | 10/2015 | Swanson et al. | |
| 2015/0278068 A1 | 10/2015 | Swanson et al. | |
| 2015/0281237 A1 | 10/2015 | Swanson et al. | |
| 2016/0065573 A1 | 3/2016 | Bulusu et al. | |
| 2016/0103771 A1 | 4/2016 | Bhesania et al. | |
| 2016/0231804 A1 | 8/2016 | Bulusu et al. | |
| 2016/0292038 A1 | 10/2016 | Swanson et al. | |
| 2016/0323284 A1 | 11/2016 | Swanson et al. | |
| 2017/0102873 A1 | 4/2017 | Hanson et al. | |
| 2017/0115886 A1 | 4/2017 | Ladkani et al. | |
| 2017/0212687 A1 | 7/2017 | Kelly et al. | |
| 2017/0228168 A1 | 8/2017 | Bahnsen et al. | |
| 2018/0004590 A1* | 1/2018 | Johnson .............. | G06F 11/0709 |
| 2018/0032349 A1 | 2/2018 | Bhimanadhuni et al. | |
| 2018/0060168 A1 | 3/2018 | Kelly et al. | |
| 2018/0060231 A1 | 3/2018 | Kelly et al. | |
| 2018/0107596 A1 | 4/2018 | Kelly et al. | |
| 2018/0107605 A1 | 4/2018 | Dong et al. | |
| 2018/0121490 A1 | 5/2018 | Pendharkar et al. | |
| 2018/0165101 A1 | 6/2018 | Bulusu et al. | |
| 2018/0314580 A1 | 11/2018 | Kelly et al. | |
| 2019/0073478 A1 | 3/2019 | Knessib et al. | |
| 2019/0121710 A1 | 4/2019 | Bulusu et al. | |
| 2019/0163557 A1 | 5/2019 | Nguyen et al. | |
| 2019/0179628 A1 | 6/2019 | Bulusu et al. | |
| 2019/0188103 A1 | 6/2019 | Bulusu et al. | |

OTHER PUBLICATIONS

"Using Persistent Memory", Retrieved from: https://docs.vmware.com/en/VMware-vSphere/6.7/com.vmware.vsphere.storage.doc/GUID-93E5390A-8FCF-4CE1-8927-9FC36E889D00.html, May 31, 2019, 02 Pages.
"Dell EMC NVDIMM-N Persistent Memory", in User Guide of Dell EMC, Apr. 2019, 57 Pages; retrieved from <<https://topics-cdn.dell.com/pdf/poweredge-r740_users-guide3_en-us.pdf>>.
"Software-defined memory", retrieved from <<https://en.wikipedia.org/wiki/Software-defined_memory>>, 2 pages, Jul. 30, 2017.
Chris Evans, "What are Storage Class Memory (SCM) and Persistent Memory (PM)?", retrieved from <<https://www.architecting.it/blog/what-are-scm-and-pm/>>, Feb. 6, 2018, 9 pages.
Chris Mellor, "Escaping the DRAM price trap: Storage Class Memory, what it is and why it matters", retrieved from <<https://blocksandfiles.com/2018/Nov. 28, 2019-the-year-of-storage-class-memory/>>, Nov. 28, 2018, 15 pages.
"VM sizes supported in Azure Stack", retrieved from <<https://docs.microsoft.com/en-us/azure-stack/user/azure-stack-m-sizes>>, Apr. 11, 2019, 10 pages.
"Advanced Configuration and Power Interface", retrieved from <<https://en.wikipedia.org/wiki/Advanced_Configuration_and_Powerinterface>>, Jun. 16, 2019, 7 pages.
"Defragmentation", retrieved from <<https://en.wikipedia.org/wiki/Defragmentation>>, Jul. 21, 2019, 5 pages.
"Aperture (computer memory)", retrieved from <<https://en.wikipedia.org/wiki/Aperture_(computer_memory)>>, Oct. 18, 2016, 1 page.
"International Search Report and Written Opinion Issued in PCT Application No. PCT/US2020/037681", dated Oct. 1, 2020, 14 Pages.

* cited by examiner

DATA PRESERVATION USING MEMORY APERTURE FLUSH ORDER

BACKGROUND

Systems architects and other people who design, implement, modify, or optimize computing systems recognize that data storage choices often involve tradeoffs. For example, some devices capable of storing digital data, such as some dynamic random access memory devices, support relatively fast data storage operations but do not reliably retain data in the event of a power loss. These devices are referred to generally as "volatile" storage devices. Many volatile storage devices exist, with different technical characteristics such as capacity, cost, expected working life, operational speeds, replacement difficulty, electrical requirements, and compatibility with hardware or software standards or best practices. Other data storage devices, such as electro-mechanical hard disk drives and solid state drives, do reliably retain data values even after electrical power is cut. These devices are referred to generally as "non-volatile" storage devices. Many non-volatile storage devices also exist, again with different technical characteristics.

Accordingly, systems architects and other people who must choose between available storage mechanisms and procedures face an extremely large number of storage device choices, with many interdependent tradeoffs between technology choices and system performance, cost, convenience, reliability, and other characteristics. To reduce complexity and enhance predictability, it may therefore be helpful to focus on particular performance assumptions, goals, or insights, in order to narrow and prioritize the storage architecture choices that will be given serious consideration.

SUMMARY

Some embodiments described in this document provide improved data preservation tools and techniques, especially in networked multi-node environments such as clouds running virtual machines. A risk of losing critical data is reduced in some embodiments by making memory allocations based on a battery-backed memory aperture flush order and on related information about battery characteristics. Such storage allocations may also reduce data redundancy requirements without compromising data integrity.

In some embodiments, a computing system has a data preservation subsystem which includes a battery-backed memory having an aperture. The aperture has a flush order, which is an order of copying data from the aperture to an aperture-associated non-volatile storage in response to a data integrity threat such as power loss or reboot. The flush order defines a first-to-flush end of the aperture and a last-to-flush end of the aperture.

In this example, a data preservation circuitry is in operable communication with the battery-backed memory. The data preservation circuitry, which may include a processor and firmware, is configured to perform data preservation steps. In this example, these data preservation steps may include (a) receiving a request to store a dataset A-data in the aperture, with A-data including data which is designated as critical data, (b) identifying a portion A-memory of unallocated memory of the aperture, A-memory being large enough to hold A-data, A-memory having an address which is closer to the aperture first-to-flush end than any other address of any other unallocated memory of the aperture, and (c) marking A-memory as allocated and placing a copy of A-data in A-memory. These steps (a)-(c) may be repeated multiple times for different respective datasets that contain critical data.

In this example, the data preservation steps may also include (d) receiving a request to store a dataset Z-data in the aperture, Z-data not including any data which is designated as critical data, (e) identifying a portion Z-memory of unallocated memory of the aperture, Z-memory being large enough to hold Z-data, Z-memory having an address which is closer to the aperture last-to-flush end than any other address of any other unallocated memory of the aperture, and (f) marking Z-memory as allocated and placing a copy of Z-data in Z-memory. These steps (d)-(f) may be repeated for different respective datasets that do not contain critical data, and may be omitted when only critical data is being stored.

The labels (a)-(f) serve herein merely as identifiers, without necessarily specifying a sequence of operation. For instance, Z-data may be stored in the aperture before any A-data is stored therein.

In this context, the example data preservation subsystem provides a higher likelihood of successfully flushing critical data and thereby preserving it, by placing the critical data ahead of non-critical data in the flush-order in the battery-backed memory, as opposed to storing data in the battery-backed memory without regard to data criticality. Alternate forms of data preservation, such as maintaining replicated or other redundant copies of critical data outside a threatened computing system, may be reduced or eliminated in view of the data preservation subsystem capabilities described herein.

In operation, some data preservation embodiments described herein receive multiple requests, with each request seeking storage of a respective dataset in an aperture of a battery-backed memory. The aperture has a flush order which is an order of copying data from the aperture to an aperture-associated non-volatile storage in response to a data integrity threat. The flush order defines a first-to-flush end of the aperture and a last-to-flush end of the aperture. In this example, each respective dataset includes data which is designated as critical data. For at least two of the requests, the embodiment identifies a respective portion of unallocated memory of the aperture, each portion of unallocated memory being large enough to hold the respective dataset. The identified respective portion of unallocated memory has an address which is closer to the aperture first-to-flush end than any other address of any other unallocated memory of the aperture. For at least one of the requests, the embodiment marks the identified respective portion of unallocated memory as allocated and places therein a copy of the respective dataset.

Continuing this example, at some point after storing at least one piece of critical data, the embodiment detects the data integrity threat, e.g., detects an upcoming reboot or an imminent loss of external power with a consequent switch to battery power. In response to the threat detection, the embodiment flushes all of the critical data which was copied into the aperture, thereby copying that critical data from the aperture to the non-volatile storage. This flush preserves all of the critical data that was copied into the aperture, and thus preserves the critical data (and possibly some or all of the non-critical data as well) without any reliance on having a redundant copy of the data outside the scope of the aperture and its non-volatile backup memory.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
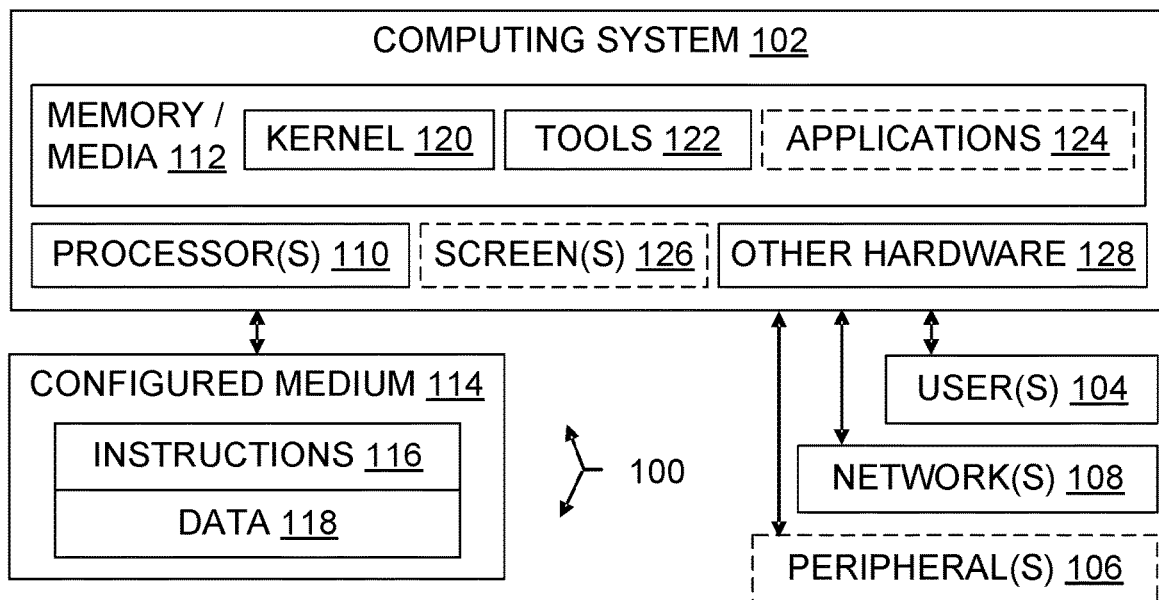
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges of storing big data for machine learning. Internet of Things devices can pump out data in large amounts and at a rapid rate, and machine learning tools and techniques can sometimes process this flood of data in helpful ways. Some machine learning databases include millions of records, within an active database so that fast read speeds are important. Notwithstanding the large amount of data involved, data integrity is also important, both in the sense that unauthorized intentional changes to individual pieces of data are undesirable and in the sense that data changes caused by reboots or unexpected power loss are undesirable.

Other factors also played a role in this motivational situation. In particular, cost concerns prevent or discourage one from simply placing all data in NVDIMM or similar battery-backed fast random access memory. Even if placing all data in NVDIMM were possible, that would not address risks to data integrity posed by battery failure. Battery backup is not as reliable as, say, storage on hard disks or DVDs or tape or some similar non-volatile medium. Battery life varies over time. One may consider replicating the data across multiple NVDIMM devices for added security, but cost is again an important factor. Moreover, the level of acceptable risk to data integrity is not always constant. For example, different customers may have different Service Level Agreements (SLAs) or other service targets or guarantees.

In short, some data preservation tools and techniques described herein were motivated to an extent by the technical challenges presented in efforts to preserve large sets of machine learning data. However, one of skill will recognize that the teachings provided herein have beneficial applicability to many other technical scenarios as well.

Some embodiments described herein implement a combination of operational steps and device characteristics to preserve data against integrity threats. Data is divided into critical data and non-critical data, based on criteria such as customer requirements, workload criticality, or virtual machine criticality. Critical data is stored in a battery-backed memory at physical addresses where it will be flushed ahead of the non-critical data. Some embodiments recognize and address the risk that the battery's power will not be enough to flush both the critical data and the non-critical data to safety, e.g., by keeping redundant copies of the non-critical data in case it does not get flushed in time. Battery-backed memory apertures are sized according to the battery's characteristics, and may be resized as conditions change. Defragging is performed to optimize use of the aperture, especially within the portion that holds critical data. Other aspects of innovative data preservation are also discussed herein.

Some embodiments described herein may be viewed by some people in a broader context. For instance, concepts such as allocation, data, order, power, preservation, and requests may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to balance NVDIMM costs against service level agreement data availability requirements. Other configured storage media, systems, and processes involving allocation, data, order, power, preservation, or requests are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular motivating examples, requests, responses, operating systems or other kernels, software development environments, interface standards, software processes, development tools, identifiers, files, data structures, notations, control flows, pseudocode, naming conventions, node architectures, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as memory allocation, flushing data from volatile storage to non-volatile storage, sizing or resizing a memory aperture based on battery characteristics, and defragging memory, which are each activities deeply rooted in computing technology. Some of the technical mechanisms discussed include, e.g., NVDIMM or other battery-backed memory, a Unified Extensible Firmware Interface, compute nodes, storage nodes, memory maps, flush order, and virtual machines. Some of the technical effects discussed include, e.g., an increased likelihood that critical data will be preserved against an integrity threat, a reduced reliance on data redundancy to provide data preservation, and an efficient sizing of battery-backed memory apertures in view of criteria such as battery characteristics and an amount of memory reserved for non-critical data. Thus, purely mental processes are clearly excluded. Some embodiments improve the functioning of computing systems and services by preserving data against integrity threats while balancing criteria such as NVDIMM cost, customer service level requirements, and the availability of node storage for data redundancy. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.

ACPI: advanced configuration and power interface
ALU: arithmetic and logic unit
API: application program interface
BIOS: basic input/output system
BMC: baseboard management controller
CD: compact disc
CPU: central processing unit
EFI: extensible firmware interface
DRAM: dynamic random access memory
DVD: digital versatile disk or digital video disc
FPGA: field-programmable gate array
FPU: floating point processing unit
GPU: graphical processing unit
GUI: graphical user interface
HDD: hard disk drive (e.g. solid state, electromechanical, optical)
IaaS or IAAS: infrastructure-as-a-service
ID: identification or identity
IoT: internet of things
LAN: local area network
NVDIMM: non-volatile dual inline memory module
NVMe: non-volatile memory express
OS: operating system
PaaS or PAAS: platform-as-a-service
RAM: random access memory
ROM: read only memory
SATA: serial ATA (computer bus interface)
SLA: service level agreement
SMM: system management mode
TCP/IP: transmission control protocol/internet protocol
UEFI: Unified Extensible Firmware Interface
VM: virtual machine
WAN: wide area network
Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

A distinction may be made in some situations between the meaning of "data availability" and the meaning of "data integrity", e.g., within cybersecurity discussions of the confidentiality-integrity-availability triad. But as used herein, "data integrity" is meant to encompass both the ability to access data and the ability to access data which has the correct values. Thus, storage device power loss, value overwriting, irreversible encryption or encoding or compression, tampering, misplacement, scrambling, inaccessibility, and data value indeterminacy are all examples of threats to data integrity.

Unless stated expressly otherwise, as used herein "defrag" refers to flush defrag ("defrag" is short for "defragment"). A flush defrag is an operation which reduces the amount of memory that is unallocated near the first-to-flush end of an aperture, or increases the distance of unallocated memory from the first-to-flush end of the aperture, or does both. A flush defrag may involve copying data, or moving data, or inserting data into previously unallocated memory, for example.

A "flush defrag" differs from a "consolidation defrag" in that they have different goals. Flush defrags have a goal of prioritizing the flushing of critical data over the flushing of non-critical data or the flushing of garbage or irrelevant data that is in unallocated memory. Consolidation defrags, by contrast, have a goal of reducing the time needed to retrieve data from storage for use, especially from spinning disk platters or from tape. Consolidation defrag tries to bring together all of the data belonging to a particular owner, e.g., all the data that's in a particular file. These are not equivalent operations.

For example, let A or B represent critical data owned by A or by B respectively, let underscore _ represent unallocated space in memory, and let the memory aperture bounds be represented by curly braces. Then changing {ABA_} to {AAB_} would be a consolidation defrag but would not be a flush defrag. Also, changing {A_B_} to {AB_} would be a flush defrag (if the first-to-flush end is at the left) but would not be a consolidation defrag.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Data preservation operations such as identifying unallocated memory, copying data into memory, marking memory as allocated, flushing data from volatile to non-volatile storage, and many other operations discussed herein, are understood to be inherently digital. A human mind cannot interface directly with a CPU or other processor, or with RAM or other digital storage, to read and write the necessary data to perform the data preservation steps taught herein. This would all be well understood by persons of skill in the art in view of the present disclosure, but other people may sometimes need to be informed of this, or reminded of it.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as allocating, copying, defragging, designating, detecting, determining, eliminating, executing, failing, flushing, identifying, keeping, marking, moving, placing, preserving, providing, receiving, reducing, reserving, residing, resizing, restoring, saving, sending, specifying, storing (and allocates, allocated, copies, copied, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

Figure 8:
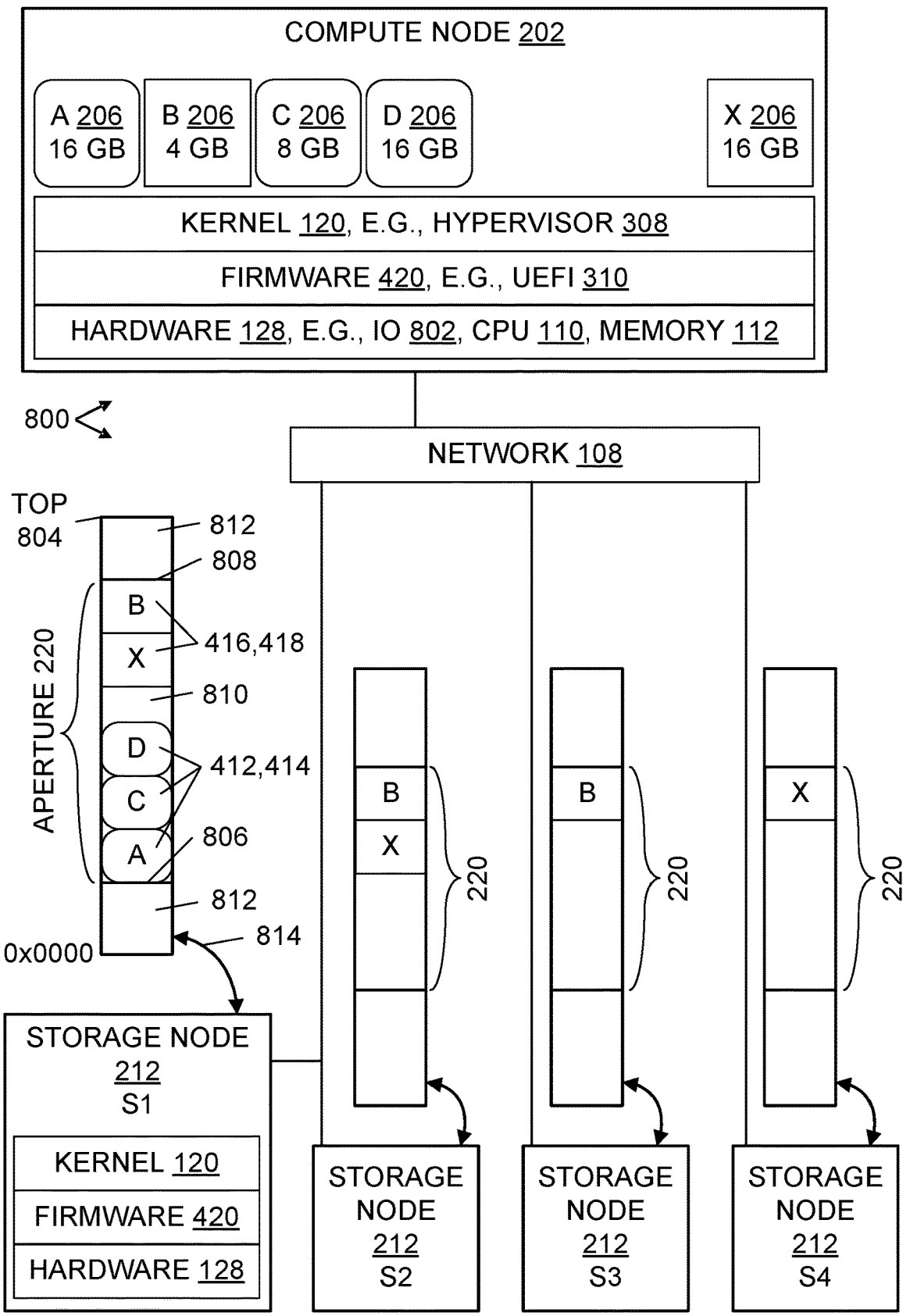
FIG. 8 is an architecture diagram illustrating a compute node which bears several virtual machines and is networked with several storage nodes that have battery-backed memory apertures.

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, debuggers, profilers, compilers, interpreters, decompilers, assemblers, disassemblers, source code editors, autocompletion software, simulators, fuzzers, repository access tools, version control tools, optimizers, collaboration tools, software development tools and tool suites, hardware development tools and tool suites, diagnostics, etc.
124 applications, e.g., word processors, web browsers, spreadsheets, games, email tools
126 display screens, also referred to as "displays"
128 computing hardware not otherwise associated with a reference number 106, 108, 110, 112, 114; in FIG. 8 the numeral 128 also refers to processor 110 and memory 112 hardware
200 compute functionality, e.g., in a compute node
202 compute node
204 data source, e.g., program that outputs or otherwise generates data
206 virtual machine, e.g., a computing construct which provides hardware virtualization and includes an operating system; may include, e.g., working memory resource, CPU resource, 10 resource, and non-volatile memory
208 system code, e.g., operating system, hypervisor, BIOS, UEFI, firmware
210 storage functionality, e.g., in a storage node
212 storage node
214 non-volatile storage, e.g., NVDIMM, disk, flash memory
216 battery
218 battery-backed memory
220 memory aperture; may refer to a portion of a physical address space that is associated with digital data storage locations in a physical device, or may refer to the digital data storage locations themselves
222 data storage request
224 response to data storage request
226 replica of data
300 aspect of a computing environment
302 cloud; may also be referred to as "cloud computing environment"
304 data preservation circuitry; includes electronics and any firmware which controls those electronics or their usage data preservation circuitry; does not necessarily include the non-volatile storage the data is flushed to
306 data preservation subsystem; includes non-volatile storage that data is flushed to
308 hypervisor
310 UEFI; may refer to a Unified Extensible Firmware Interface, or to firmware which has such an interface; may include or provide functionality for SEC (security), PEI (pre-EFI initialization), DXE (driver execution environment), BDS (boot device selection), SMM (system management mode), for example
312 flush order
314 data integrity threat
316 storage relationship between two or more nodes
318 data criticality; may refer to whether data has been designated as critical, or refer to whether data satisfies criteria to me designated as critical even if not yet thus designated; may be a Boolean, or another indication, e.g., a value in a range of two or more values that indicate how to prioritize flushing of data
402 volatile memory, e.g., DRAM per se
404 NVDIMM
406 battery characteristics
408 defragger (memory defragmentation) code
410 defrag portion of memory, that is, portion subject to defragging
412 dataset which includes critical data (may also have some non-critical data)
414 memory allocated to (or being allocated to) hold critical data 412
416 dataset which does not include any critical data
418 memory allocated to (or being allocated to) hold non-critical data 416
420 firmware 422 allocator software, namely, software which identifies unallocated space in an aperture, places critical data therein toward the first-to-flush end of the aperture, and marks the space as allocated; an allocator may also defrag the aperture; an allocator may also identify space for non-critical data and place non-critical data toward the last-to-flush end of the aperture 424 physical address in a memory 112; may refer to an address (e.g., 0x0000) itself or to a storage location (e.g., memory cell) at an address 502 battery capacity, e.g., in milliampere-hours 504 reliability value, e.g., mean time between failures, or remaining expected life, or an enumeration value (e.g., 2 in a scale where 10 is best and 0 is worst) or reliability class (e.g., medium reliability)

506 battery age, e.g., hours elapsed since installation, or number of charge cycles experienced, or number of times used during a flush 600 examples of data criticality criteria 602 data criticality criterion 604 priority assigned to a virtual machine which generated the data 606 customer, e.g., cloud tenant 608 status assigned to a customer; may be evident, e.g., in an SLA 610 workload, e.g., processing task assigned to a particular compute node 612 priority assigned to a workload which includes the data or from the execution of which the data was generated 702 physical machine, e.g., processor, circuitry, chips, battery, display, power supply, housing, etc. including any embedded firmware or software stored in non-volatile memory of the physical machine; computing systems 102 include one or more physical machines 702

704 node in a cloud or other network; compute nodes 202 and storage nodes 212 are examples of nodes 704

706 container, e.g., a computing construct which provides user space virtualization and does not itself include an operating system but is nonetheless reliant upon an operating system to execute 800 computing system with one or more compute nodes networked with one or more storage nodes and equipped with data preservation functionality as taught herein 802 I/O (input/output) hardware and software, e.g., ports, connectors, sockets, network interface cards; may also be referred to as "10"

804 top of memory 806 first-to-flush end of aperture 808 last-to-flush end of aperture 810 unallocated space in aperture 812 portion of memory in same memory device but outside of aperture 814 logical mapping between virtual address space and physical address space 900 computing system with a system having an operating system running virtual machines or containers and equipped with data preservation functionality as taught herein 902 non-volatile storage 112 dedicated to receiving data flushed to it 904 memory region which is mapped to dedicated storage 902; battery-backed memory apertures 220 are an example of regions 904

Figure 9:
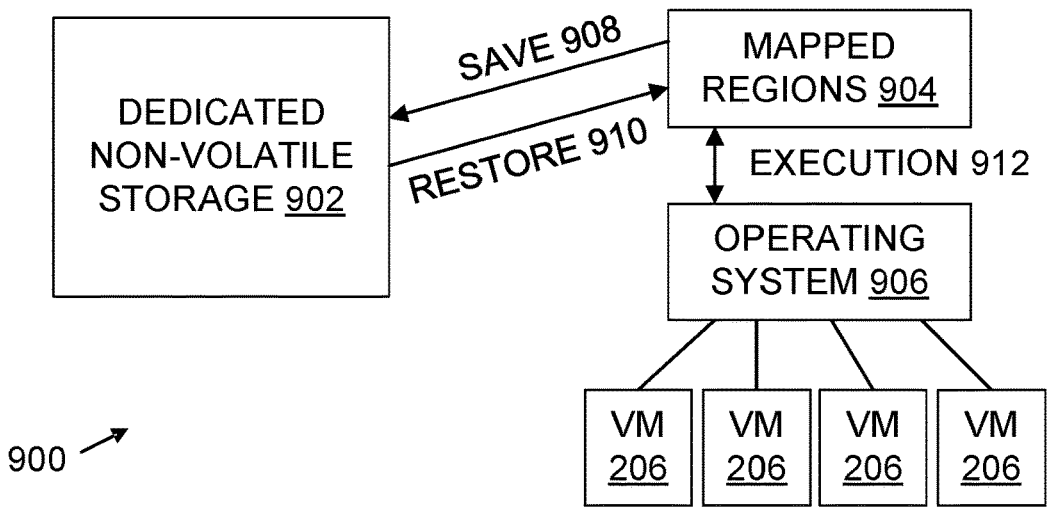
FIG. 9 is an architecture diagram illustrating an operating system running several virtual machines and using storage-backed memory apertures.
Figure 10:
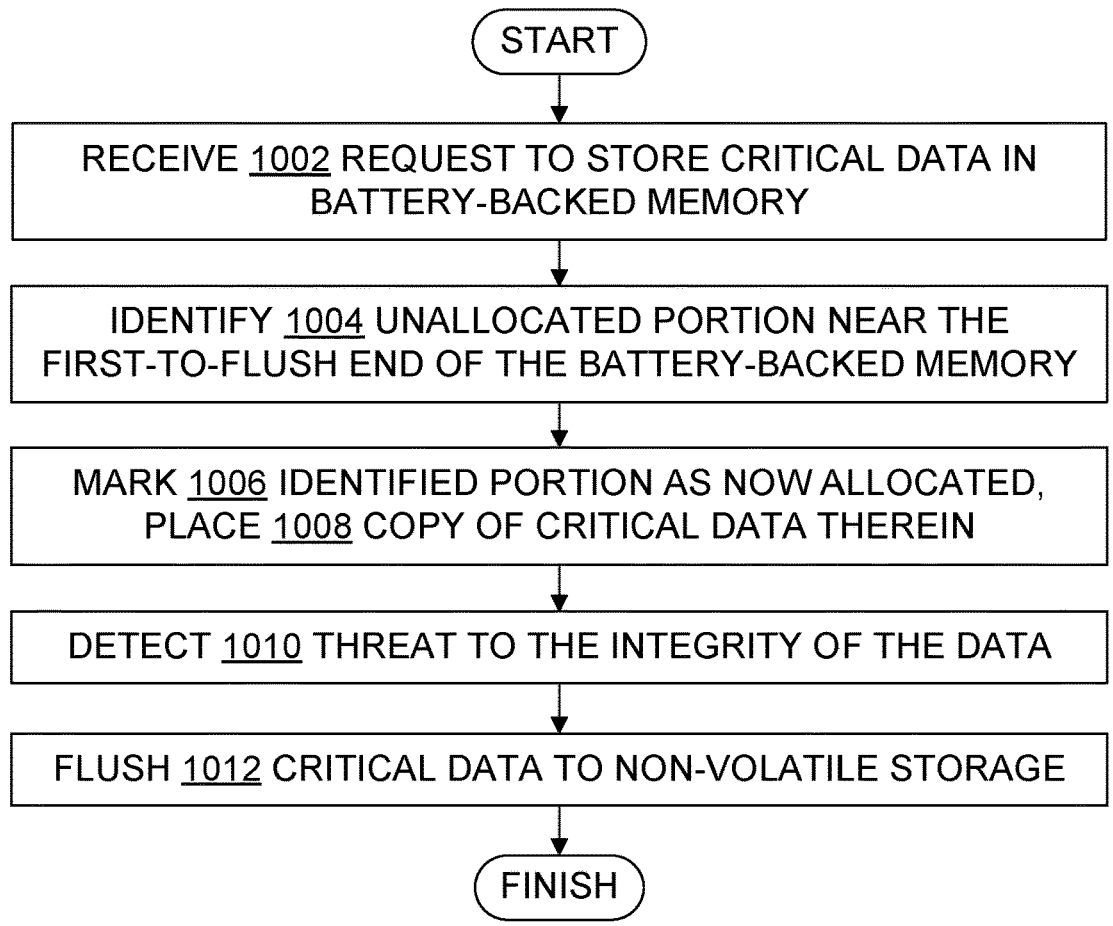
FIG. 10 is a flowchart illustrating steps in some data preservation methods.
Figure 11:
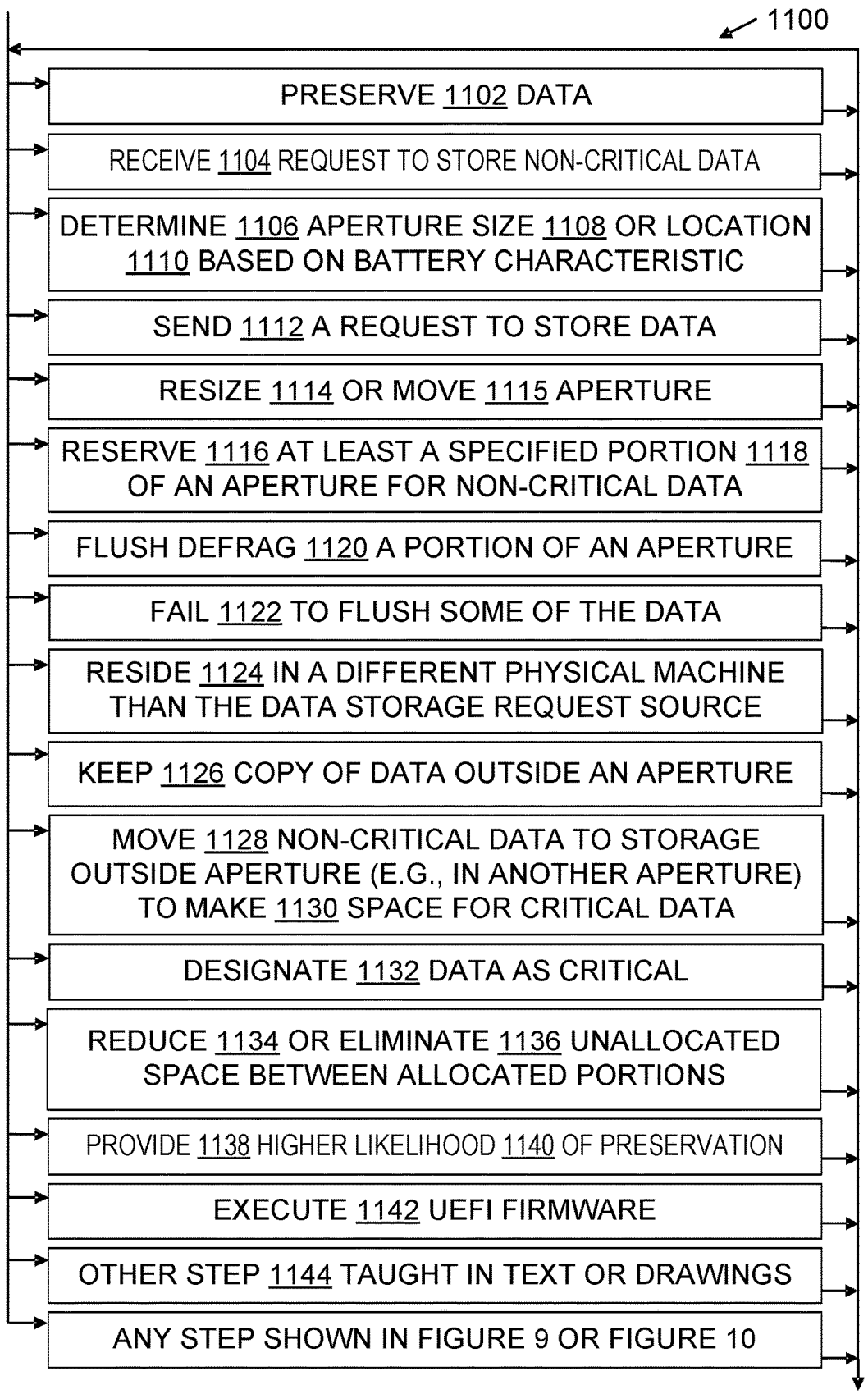
FIG. 11 is a flowchart further illustrating steps in some data preservation methods.

906 operating system 908 save operation which copies data from volatile memory to dedicated non-volatile storage backing that volatile memory; a save may be done intentionally without any impending threat to the integrity of the data being saved or may be a flush done in response to an impending or current threat 910 restore operation which copies data from dedicated non-volatile storage into volatile memory that is backed by that dedicated non-volatile storage 912 execution of a program; may refer to the act of executing a program or to an instance of program operation 1000 flowchart; 1000 also refers to data preservation methods illustrated by or consistent with the FIG. 10 flowchart 1002 receive a request to store critical data, e.g., as a result of a malloc( ) call, constructor invocation, file or block or blob save, or other operation that seeks storage of data for which storage locations (bytes, pages, etc.) are not yet allocated 1004 identify an unallocated portion of memory, e.g., using system memory management software, a free list, bit vectors showing free chunks, or similar mechanisms 1006 mark a portion of memory as allocated, e.g., by setting a bit in a data structure that tracks memory allocations 1008 place a copy of data in memory, e.g., by performing functionality used by memcpy( ), block copy, or the like 1010 detect a threat to data integrity, e.g., by receiving a Power command on an ACPI compliant system, or by receiving a signal from a voltage level monitoring circuit 1012 flush data from volatile storage to dedicated non-volatile backing storage, e.g., by copying data from a DRAM portion of an NVDIMM to a flash portion of the NVDIMM 1100 flowchart; 1100 also refers to data preservation methods illustrated by or consistent with the FIG. 11 flowchart (which incorporates the steps of FIG. 9 and the steps of FIG. 10)

1102 preserve data, i.e., maintain integrity of at least one copy of the data 1104 receive a data storage request 1106 determine or specify size or location of an aperture 220

1108 size of an aperture 220, e.g., in bytes or blocks 1110 location of an aperture 220, e.g., offsets of the ends of the aperture from a lowest physical address of a memory device containing the aperture 1112 send a data storage request 1114 resize an aperture 1115 move an aperture 1116 reserve at least a specified portion of an aperture to hold only non-critical data 1118 a reserved portion of an aperture; may be specified by absolute or relative memory addresses, or as a percentage of the total aperture size 1120 defrag at least a portion of an aperture, by copying data, or moving data, or inserting data into previously unallocated memory, thereby reducing the amount of memory that is unallocated or increasing the distance of unallocated memory from the first-to-flush end of the aperture, or both; this may be referred to as "flush defrag" to distinguish it from other uses of "defrag" which involve consolidating portions of memory that belong to, e.g., the same user or the same process or the same file 1122 fail to flush part of the data from an aperture; this results in at least a partial loss of the data unless another copy of the data is available somewhere outside the aperture and outside the non-volatile storage the rest of the data was flushed into

1124 reside in a physical machine, e.g., be stored in memory (volatile or non-volatile) that is part of the physical machine

1126 keep a copy of data somewhere outside an aperture and also outside the non-volatile storage the aperture would be flushed into

1128 move data

1130 make space, that is, change a given part of memory from allocated to free

1132 designate data as critical; when data is treated as a unit, then designating any part of the unit as critical also designates the unit as critical

1134 reduce amount of unallocated space between allocated portions

1136 eliminate unallocated space between allocated portions

1138 provide a better likelihood of preserving critical data against a threat

1140 likelihood of preserving critical data against a threat; may be a measured probability, or a reasoned assessment

1142 execute firmware; an example of execution 912

1144 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, customers, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types.

The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components, which may include firmware or be controlled by firmware, or both. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 11, some embodiments use or provide a functionality-enhanced system 800 or 900. The functionality enhancement helps promote data preservation by implementing a combination of operational steps and device characteristics to preserve data against integrity threats 314. Data 118 is divided into critical data 412 and non-critical data 416, and critical data is stored in one or more battery-backed memory 218 apertures 220 at physical addresses 424 where it will be flushed 1012 ahead of the non-critical data when a threat is detected 1010. Battery-backed memory apertures 220 are sized according to the battery's characteristics 406, and may be resized as conditions change. A defragger 408 optimizes use of an aperture to store critical data 412.

Figure 2:
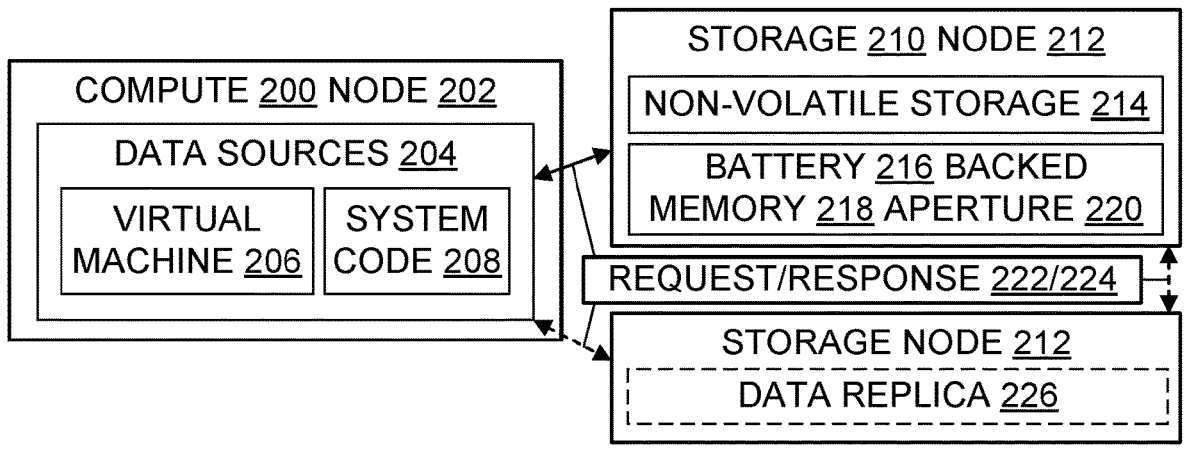
FIG. 2 is a block diagram illustrating an environment which includes a compute node and at least one storage node.

As shown with the example architecture of FIG. 2, data 118 may be generated by sources 204 such as virtual machines 206 or containers 706 running 912 on a compute node 202. These data sources invoke or rely on system code 208 to send the generated data 118 to a storage node 212. In this FIG. 2 example, the storage node 212 has fast volatile memory 402, at least part of which is battery-backed memory 218. At least part of the battery-backed memory 218 is specified for use as an aperture 220 to help preserve critical data as taught herein. The storage node 212 and the compute node 202 communicate via requests 222 (e.g., here is data to store, please send back the data stored under identifier Z) and responses 224 (e.g., successful storage, out of room in aperture, here is the requested data, or other status or error codes). The requests 222 and responses 224 may travel over a TCP/IP network 108, an Ethernet network 108, a storage area network 108, ora combination thereof, for example.

In general, the compute node—storage node relationship 316 is not necessarily one-to-one. One compute node may process data sent or received from one storage node, or communicate with multiple storage nodes; one storage node may store data on behalf of one or more compute nodes. FIG. 8, for example, shows one compute node 202 using four storage nodes 212.

As indicated in FIGS. 2 and 8, in some embodiments the critical data 412 is not replicated across storage nodes, whereas non-critical data 416 is replicated across storage nodes. Thus, critical data may be preserved against threats primarily or solely by flushing that critical data to non-volatile storage, whereas non-critical data may be preserved against threats primarily or solely by replicating it across nodes.

In FIG. 8, critical data 412 and corresponding allocated areas 414 in an aperture 220 belong to virtual machines A, C, and D, and are indicated by rounded corners in the drawing, whereas non-critical data 416 and corresponding allocated areas 418 in the apertures 220 belong to virtual machines B and X, and are indicated by right-angle corners in the drawing. Data replicas 226 of the data belonging to virtual machines B and X are shown, with storage nodes S1, S2, S3 having replicas of non-critical data 416 of virtual machine B, and storage nodes S1, S2, S4 having replicas of non-critical data 416 of virtual machine X.

FIGS. 8 and 9 show some examples of system code 208, namely, kernels 120 (e.g., hypervisor 308, operating system 906) and firmware (e.g., UEFI firmware 310). Compute nodes and storage nodes are computing systems 102 and thus include hardware. Although for clarity hardware other than memory 112 is not called out expressly in FIG. 2, some examples of hardware are called out in FIG. 8, e.g., IO 802 and CPU 110, along with memory 112, 218. Memory 218 includes aperture 220, memory 812 outside the aperture, allocated memory 418 and 414 inside the aperture, and unallocated memory 810 inside the aperture.

The physical addresses 424 of the battery-backed memory 218 or another aperture-containing mapped volatile region 904 may be mapped to virtual addresses by a mapping 814. Mapping 814 implements a level of indirection, which allows the same save 908 and restore 910 firmware to be used with apertures that may have different physical start 806 and physical end addresses 808 than one another. The non-volatile memory 112 to which the aperture 220 data is flushed may include flash or other non-volatile storage in NVDIMM 404 or other dedicated non-volatile storage 902, or both.

Figure 3:
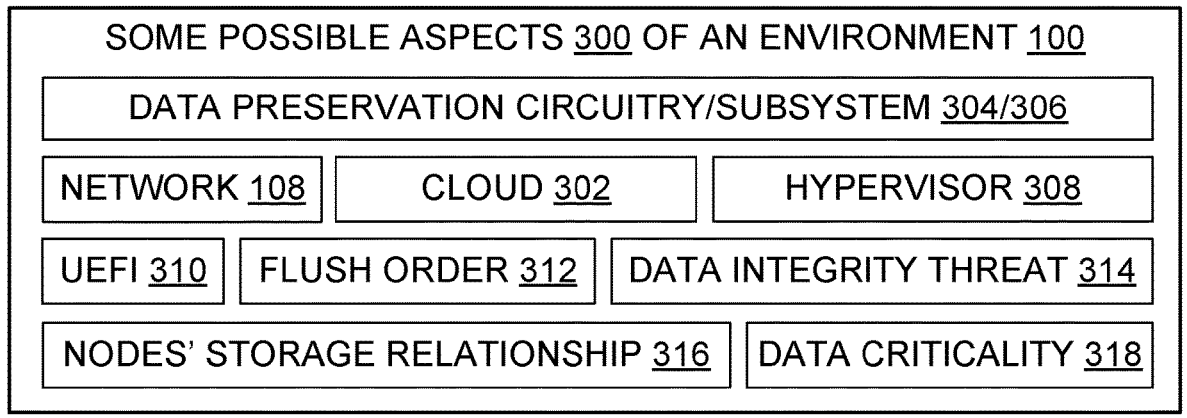
FIG. 3 is a block diagram illustrating some aspects of some computing environments.

FIG. 3 shows various aspects 300 of some computing environments 100, which are discussed as appropriate at various points in this disclosure.

Figure 4:
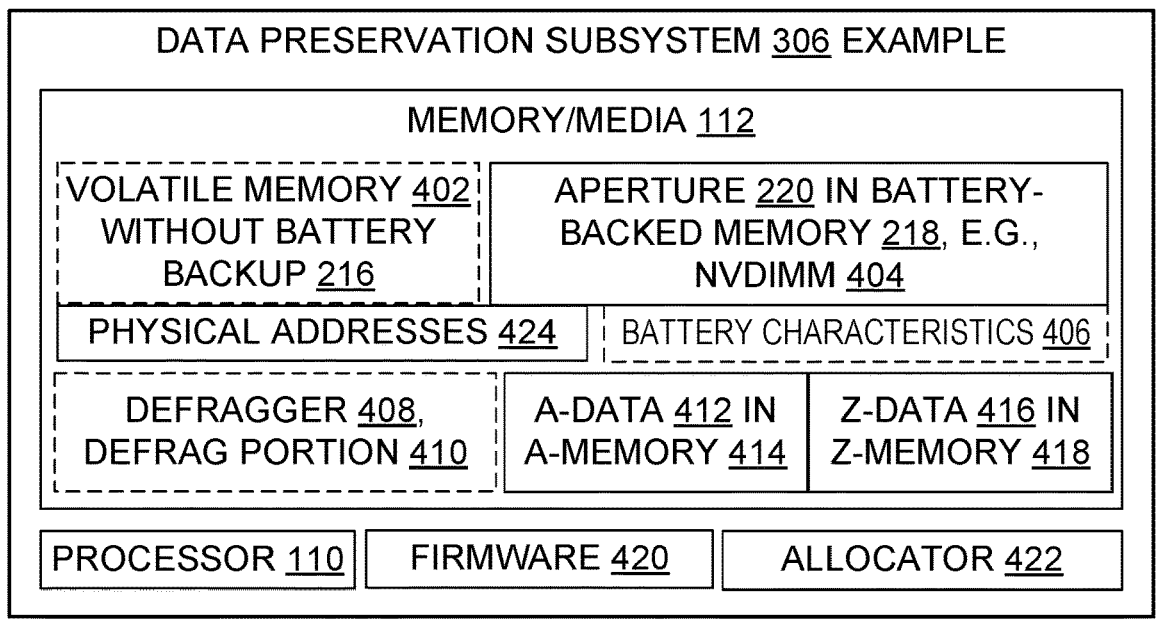
FIG. 4 is a block diagram illustrating aspects of a system which is configured with data preservation functionality.
Figure 5:
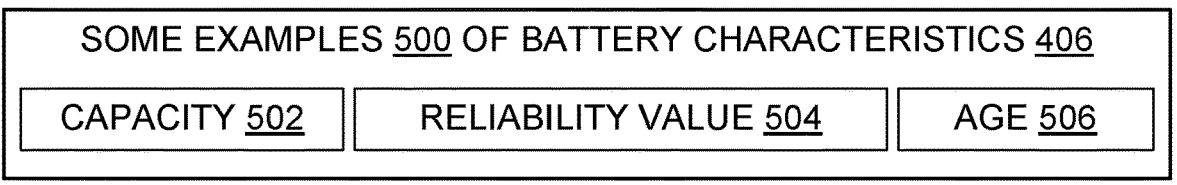
FIG. 5 is a block diagram illustrating some examples of battery characteristics.

FIG. 4 illustrates an example data preservation subsystem 306 which may add innovative data preservation functionality to a computing system 102. Memory of the subsystem 306 includes an aperture 220 in a battery-backed memory 218, e.g., NVDIMM 404. As noted in FIGS. 4 and 5, the battery may have characteristics 406 that are tracked or otherwise indicated, such as one or more of a capacity 502, a reliability 504, and an age 506. These battery characteristics 406 may overlap or influence one another, e.g., reliability may decrease with age. The subsystem 306 may also include volatile memory 402 that is not backed by a battery 216.

In operation, the aperture 220 will have one or more regions 414 containing critical data 412, and the aperture 220 may have one or more regions 418 containing non-critical data 416. Some apertures 220 may contain only non-critical data, at least at a given point in time, e.g., as shown in FIG. 8 storage nodes S2, S3, S4, but a focus of interest herein is the apertures 220 that do contain critical data. In particular, this disclosure informs one how to place critical data in memory 112 (by initial allocation, or through defragging, or both) so as to increase the likelihood 1140 that the critical data will be successfully flushed in response to a data threat and thus be preserved 1102.

Figure 6:
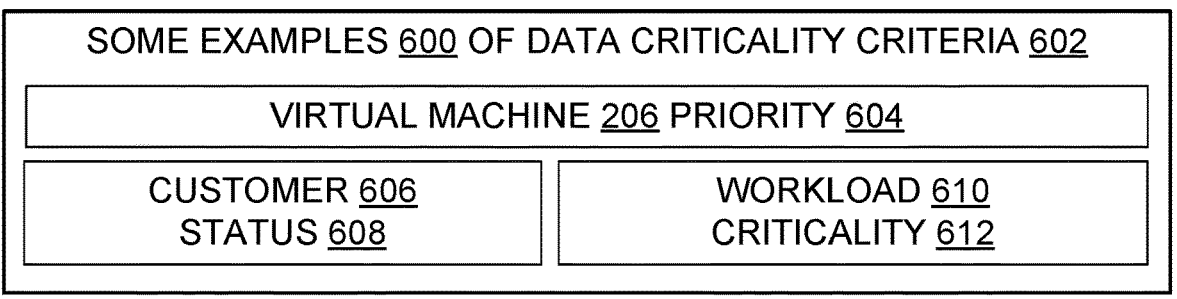
FIG. 6 is a block diagram illustrating some examples of data criticality criteria.

FIG. 6 illustrates some examples 600 of criteria 602 that may be applied to distinguish critical data 412 from non-critical data 416. For example, data may be designated as critical if it is generated by a virtual machine 206 or a container 706 or another digital artifact, and that artifact has a high priority 604. Data 118 may be designated 1132 as critical if it is generated by or on behalf of a particular customer 606 who has paid for or otherwise obtained a status 608 that indicates critical data. Similarly, data may be designated 1132 as critical if it is generated by or on behalf of, or is processed by, a particular workload 610 that has a priority or status 612 that indicates critical data. These example criteria may be combined in various ways, or be modified with other criteria 602, or both. For instance, (a) data may be designated as critical when it is generated by a high priority virtual machine of a high status customer but otherwise be designated as non-critical, (b) data may be designated as critical when it is generated by any virtual machine of a high status customer that runs on a specified secure server blade 702 but otherwise be designated as non-critical, (c) data may be designated as critical when it is generated by any customer during a specified time period but otherwise be designated as non-critical, and so on.

Figure 7:
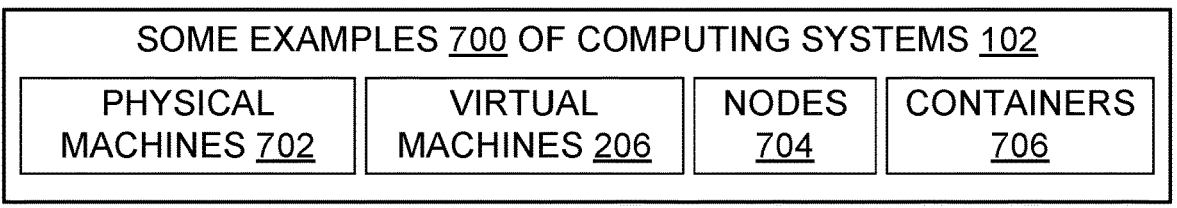
FIG. 7 is a block diagram illustrating some examples of some computing systems.

FIG. 7 shows various examples 700 of some computing systems 102, which are discussed as appropriate at various points in this disclosure.

Some embodiments provide or use a data preservation subsystem 306 in a computing system 102. The data preservation subsystem 306 may include a battery-backed memory 218 having an aperture 220. The aperture 220 has a flush order 312 which is an order of copying data from the aperture to an aperture-associated non-volatile storage 902 in response to a data integrity threat 314. The flush order defines a first-to-flush end 806 of the aperture and a last-to-flush end 808 of the aperture.

Flush order may also be described using phrases such as "top-down" or "bottom-up" with the understanding that higher physical addresses 424 are above lower physical addresses. Then a top-down flush would start with higher addresses and proceed to lower addresses, while a bottom-up flush would start with lower addresses and proceed to higher addresses. The first-to-flush end 806 of the aperture would have a higher address than the last-to-flush end 808 of the aperture in a top-down flush order, and have a lower address than the last-to-flush end 808 of the aperture in a bottom-up flush order. In FIG. 8, a bottom-up (lower address to higher address) flush order 312 is illustrated, since the first-to-flush end 806 of the aperture has a lower physical address 424 than the last-to-flush end 808 of the aperture.

In some embodiments, data preservation subsystem 306 includes a data preservation circuitry 304 in operable communication with the battery-backed memory 218. The data preservation circuitry 304 is configured to perform data preservation steps which may include (a) receiving 1002 a 222 request to store a dataset A-data 412 in the aperture, A-data including data which is designated as critical data, (b) identifying 1004 a portion A-memory 414 of unallocated memory 810 of the aperture, A-memory being large enough to hold A-data, A-memory having an address 424 which is closer to the aperture first-to-flush end 806 than any other address of any other unallocated memory of the aperture, (c) marking 1006 A-memory as allocated and placing 1008 a copy of A-data in A-memory, (d) receiving a request 222 to store a dataset Z-data 416 in the aperture, Z-data not including any data which is designated as critical data, (e) identifying a portion Z-memory of unallocated memory 810 of the aperture, Z-memory being large enough to hold Z-data, Z-memory having an address 424 which is closer to the aperture last-to-flush end 808 than any other address of any other unallocated memory of the aperture, and (f) marking Z-memory as allocated and placing a copy of Z-data in Z-memory. The labels (a) through (f) herein serve merely as identifiers and thus do not necessarily themselves specify a sequence of operation. This data preservation subsystem 306 provides a higher likelihood of successfully flushing 1012 critical data and thereby preserving it, by placing the critical data ahead of non-critical data in the flush-order in the battery-backed memory. The critical data preservation likelihood is higher than it would be in an architecture that stores data in the battery-backed memory without regard to the data's criticality or lack of criticality.

In some embodiments, the battery-backed memory aperture 220 resides in or is controlled by a network node 704 designated here as X, and the request 222 to store A-data in the aperture was sent from a different network node designated here Y. In FIG. 8, for example, an aperture resides in storage node 212, 704 S1 and a request 222 to store A-data for virtual machine A in the aperture 220 was sent from a different network node than S1, namely, from the compute node. In some embodiments the network node X includes a storage node in a cloud 302, and the network node Y includes a compute node in the cloud. However, in other embodiments nodes may reside in a non-cloud network.

In some embodiments, the network node X and the network node Y are related by a storage relationship 316 designated here as R, where R is defined such that two nodes M and N are related by R when M stores data on behalf of N. In some cases, R is not a one-to-one relationship of particular nodes X and Y, e.g., a compute node may send critical data of a virtual machine VM7 to a storage node S7 and send critical data of a virtual machine VM8 to a storage node S8. Or a storage node S12 may hold critical data from a compute node C10 and also hold critical data from a different compute node C11. Of course, many other relationship 316 examples are also possible.

In some embodiments, the battery-backed memory 218 includes NVDIMM memory 404. For example, the NVDIMM 404 may include NVDIMM-F flash memory, NVDIMM-N byte-addressable memory, NVDIMM-P memory with dynamic RAM and NAND on the same device, NVDIMM-SW memory, or NVRAM non-volatile RAM memory. NVDIMM-SW may include memory (e.g., DD4 RAM), disk or flash (e.g., SSD partition), a battery, and a signaling mechanism.

In some embodiments, the computing system 102 includes virtual machines 206, the dataset A-data 412 is sent to the data preservation subsystem 306 from a virtual machine VM-A, and the dataset Z-data 416 is sent to the data preservation subsystem 306 from a virtual machine VM-Z.

In the example of FIG. 8, for instance, a critical dataset 412 is sent to enhanced storage node S1 (and thence to its data preservation subsystem 306) from virtual machine A, and a non-critical dataset 416 is sent to S1 from virtual machine B.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific examples, component names, optimizations, algorithmic choices, data, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 10 illustrates a method 1000 which is an example of methods that may be performed or assisted by an enhanced system with data preservation functionality taught herein, and illustrated by one or more of FIGS. 1 through 9. The receiving 1002, identifying 1004, marking 1006, placing 1008, detecting 1010, and flushing 1012 steps shown in FIG. 10 are discussed throughout the present disclosure, both with and without express recital of those reference numerals. In particular, the discussion of FIGS. 2, 8, and 9 pertains to the steps 1002 through 1012 shown in FIG. 10.

FIG. 11 further illustrates access control methods (which may also be referred to as "processes" in the legal sense of that word) that are suitable for use during operation of a system with enhanced data preservation functionality, including some refinements, supplements, or contextual actions for steps shown in FIG. 10. FIG. 11 also incorporates steps shown in FIG. 9 or FIG. 10. Technical processes shown in the Figures or otherwise disclosed will be performed automatically, e.g., by a data preservation subsystem 306, unless otherwise indicated. Processes may also be performed in part automatically and in part manually to the extent action by a human administrator or other human person is implicated, e.g., in some embodiments a person may specify a minimum or maximum percentage of an aperture to be reserved 1116 for non-critical data. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 10 and 11. Steps may be performed serially, in a partially overlapping manner, or fully in parallel. In particular, the order in which flowchart 1000 action items or flowchart 1100 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for data preservation in a computing system. The method may include receiving 1002 a request to store a dataset A-data in an aperture of a battery-backed memory. The aperture has a flush order 312 which is an order of copying 908 data from the aperture to an aperture-associated non-volatile storage in response to a data integrity threat 314. The flush order defines a first-to-flush end of the aperture and a last-to-flush end of the aperture. A-data includes data which is designated as critical data.

The method may also include identifying 1004 a portion A-memory of unallocated memory of the aperture, with A-memory being large enough to hold A-data, and with A-memory having an address which is closer to the aperture first-to-flush end than any other address of any other unallocated memory of the aperture. The method may also include marking 1006 A-memory as allocated and placing 1008 a copy of A-data in A-memory.

The method may also include receiving 1104 a request to store a dataset Z-data in the aperture, with Z-data not including any data which is designated as critical data.

The method may also include identifying 1004 a portion Z-memory of unallocated memory of the aperture, with Z-memory being large enough to hold Z-data, and Z-memory having an address which is closer to the aperture last-to-flush end than any other address of any other unallocated memory of the aperture. The method may also include marking 1006 Z-memory as allocated and placing 1008 a copy of Z-data in Z-memory.

By such as method, a likelihood 1140 of successfully flushing 1012 critical data and thereby preserving 1102 it is increased 1138 by placing the critical data ahead of non-critical data in the flush-order in the battery-backed memory, as opposed to not placing the critical data ahead of non-critical data in the flush-order in the battery-backed memory.

In some embodiments, the method may further include determining 1106 a size 1108 of the aperture based at least in part on a battery characteristic of the battery-backed memory. For example, smaller capacity batteries, older batteries, and less reliable batteries may result in smaller apertures. In some embodiments, the method may further include determining 1106 a location 1110 of the aperture based at least in part on a battery characteristic of the battery-backed memory. For example, an aperture in memory that is backed by a newer, larger capacity, or more reliable battery may be chosen instead of an aperture in memory backed by a smaller, older, or less reliable battery. In some embodiments, the method may include resizing 1114 or moving 1115 the aperture based at least in part on a change in a battery characteristic of the battery-backed memory, e.g., by increasing aperture size when a battery is replaced with a newer, larger, or more reliable battery. As with other steps disclosed herein, these steps may be combined in a given embodiment.

In some embodiments, the method may further include defragging 1120 at least a defrag portion of the aperture, the defrag portion including critical data. As discussed elsewhere herein, defragging 1120 refers to flush defragging; consolidation defragging may be a side-effect but is not inherently sufficient to serve as flush defragging 1120. Defragging 1120 may be proactive. Defragging 1120 may also be triggered when a tenant or process terminates, vacates, or relocates.

In some embodiments, the method may further include designating 1132 at least a portion of A-data as critical data based on at least one of the following criteria 602: a workload criticality, a virtual machine priority, or a customer status.

In some embodiments, the method may include detecting 1010 the data integrity threat, flushing 1012 all of the critical data from the aperture to the non-volatile storage, and failing 1122 to flush at least some non-critical data from the aperture to the non-volatile storage. For example, the power stored in a battery may not be sufficient to flush an entire aperture but may nonetheless be enough to flush all the critical data. This example scenario illustrates an advantage of placing critical data so that it gets flushed before non-critical data would have been flushed had the battery power sufficed.

In some embodiments, the method may include detecting 1010 the data integrity threat, flushing 1012 at least all of the critical data from the aperture to the non-volatile storage, and then restoring 910 all of the flushed data from the non-volatile storage. The flushed critical data may be restored 910 into at least one of: a volatile memory, the battery-backed memory from which the data was flushed, or a different battery-backed memory than the battery-backed memory from which the data was flushed.

In some embodiments, the method may include keeping 1126 at least one copy of Z-data outside the aperture and outside the aperture-associated non-volatile storage. That is, replication of non-critical data is compatible with reliance of careful placement 1008 and flushing 1012 of critical data, when architecting a system for data preservation.

In some embodiments, the battery-backed memory aperture resides 1124 in a physical machine denoted here as M and the request to store A-data in the aperture was sent 1112 from a different physical machine denoted here as N. For example, in the configuration shown in FIG. 2 or FIG. 8, the compute code and the storage node could be different physical machines. In an alternate configuration, they could be virtual devices running on the same underlying physical hardware.

In some embodiments, the method may include storing the A-data in only one storage node and storing copies of the Z-data in multiple storage nodes. That is, in some examples critical data preservation relies solely on placement 1008 and flushing 1012, while non-critical data preservation relies at least partially on replication 226.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as allocators 422, defraggers 408, and mappings 814, in the form of data 118 and instructions 116, read from a removable storage medium 114 and/or another source such as a network connection, to form a configured storage medium. The configured storage medium 112 is capable of causing a computer system 102 to perform technical process steps for data preservation, as disclosed herein. The Figures thus help illustrate configured storage media embodiments and process (a.k.a. method) embodiments, as well as system and process embodiments. In particular, any of the process steps illustrated in FIG. 9, 10, or 11, or otherwise taught herein, may be used to help configure a storage medium to form a configured storage medium embodiment.

Some embodiments use or provide a computer-readable storage medium 112, 114 configured with data 118 and instructions 116 which upon execution by a processor 110 cause computing system or subsystem thereof to perform a method for data preservation. This method includes receiving 1002 multiple requests, each request seeking storage of a respective dataset in an aperture 220 of a battery-backed memory, the aperture having a flush order 312 which is an order of copying data from the aperture to an aperture-associated non-volatile storage in response to a data integrity threat, the flush order defining a first-to-flush end 806 of the aperture and a last-to-flush end 808 of the aperture, each respective dataset including data which is designated as critical data.

This method also includes, for at least two of the requests, identifying 1004 a respective portion of unallocated memory of the aperture, each portion of unallocated memory being large enough to hold the respective dataset, the identified respective portion of unallocated memory having an address which is closer to the aperture first-to-flush end than any other address of any other unallocated memory of the aperture.

This method also includes, for at least one of the requests, marking 1006 the identified respective portion of unallocated memory as allocated and placing 1008 therein a copy of the respective dataset.

This method also includes detecting 1010 the data integrity threat, and flushing 1012 all of the critical data which was copied into the aperture from the aperture to the non-volatile storage. Accordingly, the method preserves 1102 all of the critical data which was copied into the aperture, despite the data integrity threat.

In some embodiments, the method further includes specifying 1106 at least one of an aperture size 1108 or an aperture address 1110, and the specifying is based on at least one of the following: a battery capacity 502, a battery age 506, or a battery reliability value 504.

In some embodiments, the flushing 1012 includes executing 1142 firmware 310 which has a unified extensible firmware interface.

In some embodiments, the method further includes reserving 1116 at least ten percent 1118 of the aperture to hold data which is not designated as critical data. For example, reserving twenty percent or reserving thirty percent would each qualify as reserving 1116 at least ten percent. In some embodiments, the portion 1118 reserved 1116 is at most ten percent, or at most twenty percent. Reserving 1116 may also be viewed or implemented as dividing an aperture or memory partition into sub-partitions.

In some embodiments, the method further includes moving 1128 data which is not designated as critical data to a storage location outside the aperture in order to make space for data which is designated as critical data. In some, the method includes defragging 1120 at least a portion of the aperture, thereby reducing 1134 or eliminating 1136 an unallocated portion that was previously located between two allocated portions of the aperture.

Additional Examples and Observations

One of skill will recognize that not every part of this disclosure, or any particular details therein, are necessarily required to satisfy legal criteria such as enablement, written description, or best mode. Also, embodiments are not limited to the particular networks, protocols, tools, identifiers, fields, data structures, functions, secrets or other proofs, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

In some embodiments, volatile memory 402 is backed up by a battery 216 and can be quickly flushed 1012 to create a copy of data 118 in a non-volatile storage 902 when the data's integrity is threatened 314 (e.g., by imminent power loss or reboot). Flushing 1012 is constrained by a flush order 312, so some data might not get flushed to a safe location. A flush may be incomplete as a result of battery failure or exhaustion, for example. Flush is an example of a data lifecycle operation; some other examples are allocate, use, replicate, deallocate, move, defrag, and restore.

Some embodiments are designed and implemented with a goal of provisioning sufficiently large batteries. So aperture size may depend on what amount of data 118 an architect or developer concludes the battery can protect. Bigger batteries, newer batteries, more reliable batteries may therefore lead to bigger apertures, and conversely smaller/older/less reliable batteries, or unknown battery characteristics, may lead to smaller apertures. Also, batteries may get de-rated/degraded over a period of time, so the ability to save large volumes of data can be affected as a function of time. Apertures 220 may be resized accordingly.

Some embodiments implement a hybrid placement order, whereby critical data is grouped at or near the flush-first 806 end of the aperture and non-critical data is grouped at or near the flush-last end 808 of the aperture. Non-critical data or critical data (or both) may also be replicated to other apertures, or other memory outside any battery-backed aperture.

The presence of data preservation technology taught herein may be inferred in some cases from documentation, from memory maps 814, from memory dumps combined with information about data criticality, from probes of machines or communications between them, from Joint Test Action Group (JTAG) debugging, from NVDIMM-SW save/restore testing, from firmware or other code listings, from other evidence, or from combinations thereof.

Some embodiments provide or use NVDIMM-SW save algorithms that can factor in criticality 612 of workloads as a way to rank and sort sets of NVDIMM-SW data. Some implement storage class memory (SCM) partitions 904 that are described by virtual machine ACPI address ranges, and map 222, 224 between virtual machines and to the SCM partitions. This guides NVDIMM-SW save routing in a runtime component of the system firmware, e.g., UEFI/SMM for Intel/AMD CPUs and UEFI/Trust Zones for ARM CPUs). Some embodiments protect 908 content 118 in any graceful or ungraceful shutdown, allowing virtual machine content 118 to be being restored 910 on the next boot. In some, NVDIMM-SW helps ensure speedy access to the data and at the same time helps ensure data flush to non-volatile stores even in the event of service disruptions such as nodes going offline.

In some embodiments, events that can trigger a flush may include an orderly shutdown, a hard reboot, or a soft reboot, for example.

An orderly shutdown gives running software a chance to prevent data corruption by saving a current version of directories, allocation tables, and other structures that describe the organization of data, and to save the data itself. For example, a shutdown command orders apps and other processes to shutdown, which in turn gives those processes a chance to flush data to non-volatile memory and close any open files, and to release allocated memory back to the OS. A shutdown command also orders device drivers to flush 10 data and current directory information to attached devices. On ACPI compliant systems, the shutdown command may cause issuance of a Power command, which causes NVDIMM to save 908 data from its volatile portion to its non-volatile portion.

A hard reboot starts with no power, except perhaps to a power supply button. Power is given to the system. Boot memory code (BIOS/EFI/UEFI) performs POST. Then boot memory code loads a bootloader into RAM from a boot device. The bootloader loads an OS into RAM from non-volatile working memory or over a network connection. Anything that was in RAM when the hard reboot began is potentially overwritten.

A soft reboot starts with power to the system. Power On Self-Test (POST) is skipped. Boot memory code loads a bootloader into RAM from a boot device. The bootloader loads an OS into RAM from non-volatile working memory or over a network connection. Anything that was in RAM when the soft reboot began is potentially overwritten.

In some implementations, an OS uses a system memory map to identify which memory regions 904 to preserve for UEFI runtime functionality after the OS boot and which areas to reclaim for OS usage. In some, the memory map is developed across all phases of UEFI pre-boot. It changes as and when memory is allocated for storing code and data. The type of memory allocation varies based on type of code and data, e.g., boot services code, boot services data, runtime code, runtime data, ACPI NVS Memory, SMM etc.

In some embodiments, NVDIMM-SW is present, and provides a firmware assisted means by which to emulate non-volatile DIMMs through coupling of DIMMs and block storage devices (NVMe or SATA etc.). A goal is to employ a standards driven approach and thus seamlessly publish NVDIMM-SW devices to the operating system. In a normal mode of operation, the pre-boot firmware publishes available NVDIMM-SW devices to the operating system. All the WRITE operations from applications taking advantage of NVDIMM-SW are targeted to DIMM regions associated with NVDIMM-SW. The SAVE # is initiated during either graceful or non-graceful shutdown scenarios. The SAVE # operation is completed before the system shutdown and subsequent restart. The RESTORE # operation is initiated by pre-boot firmware before control is given back to the operating system. NVDIMM-SW can be constructed by coupling DDR4 DIMMs and on-board M.2 NVMe modules. An NVDIMM-SW paradigm repurposes traditional DIMMs for emulating byte addressable memory. In some implementations, the system is populated with all DIMMs being the same size and memory type. NVDIMM-SW may support two modes of operation, i.e., either NVDIMM non-interleave or NVDIMM interleave. NVDIMM non-interleave where DIMMs on slot 1 will be selected as non-volatile NVDIMM (SW) NVDIMMs depending on the selected non-volatile memory size via the setup option. The maximum non-volatile memory size depends on the power duration during non-graceful save scenarios. Non-interleave NVDIMM-SW is much the same as NVDIMM-N except all 120 (serial protocol)_DSM (device specific method) data are emulated instead. In NVDIMM interleave all DIMMs within a socket will be interleaved together to support NUMA. Also, the top memory of each socket is carved out as NVDIMM-SW from the system memory map based on the non-volatile memory size as selected. A goal of event handling is to attempt saving the data from volatile memory to a non-volatile memory region. Firmware stacks (UEFI, BMC) are also responsible for logging errors for both inband and out-of-band listeners.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

Conclusion

In short, the teachings provided herein may be applied to enhance data preservation functionality in computing systems. In some embodiments, combined operational steps and device characteristics help preserve data 118 against integrity threats 314. Data 118 is divided into critical data 412 and non-critical data 416, based on criteria 602 such as customer 606 requirements 608, workload 610 criticality 612, or virtual machine 206 criticality 604. Data 118 may be generated in a compute node 202 and sent 222 for storage in a storage node 212, for example. Critical data 412 is stored in a battery-backed memory 218 aperture 220 at physical addresses 424 where it will be flushed 1012 ahead of the non-critical data 416 due to a flush order 312 that is imposed by the circuitry of the battery-backed memory or that is imposed on the battery-backed memory by external forces, e.g., system firmware 420. The flush order 312 may be, e.g., a bottom-up NVDIMM 404 flush order. Redundant copies 226 of the data 118 (especially the non-critical data 416) may also be kept 1126 in case the replicated data does not get flushed 1012 in time to preserve 1102 it. Battery-backed memory apertures 220 are sized 1106 and located 1106 according to their battery's characteristics 406, and may be relocated 1115 or resized 1114 as conditions change. Flush defragging 1120 is performed to optimize use of the aperture 220, especially within the portion 414 of the aperture that holds critical data 412.

Embodiments are understood to also include or benefit from tested and appropriate security controls and privacy controls such as the General Data Protection Regulation (GDPR), e.g., it is understood that appropriate measures should be taken to help prevent misuse of computing systems through the injection or activation of malware and help avoid tampering with any personal or private information the enhanced system may process during program execution. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 9, 10, and 11 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components (hardware or software), and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A data preservation subsystem in a computing system, the data preservation subsystem comprising:
   a battery-backed memory having an aperture, the memory including digital data storage locations addressed in a physical address space, the aperture including at least a portion of said digital data storage locations, the aperture having a physical address flush order which is an order of copying data from the aperture to an aperture-associated non-volatile storage in response to a data integrity threat, the flush order defining a first-to-flush physical address end of the aperture and a last-to-flush physical address end of the aperture;
   a data preservation circuitry in operable communication with the battery-backed memory, the data preservation circuitry configured to perform data preservation steps that include (a) receiving a request to store a dataset A-data in the aperture, the A-data including data which is designated as critical data, (b) identifying a portion A-memory of unallocated memory of the aperture, the A-memory being large enough to hold the A-data, the A-memory having a physical address which is closer to the aperture first-to-flush physical address end than any other physical address of any other unallocated memory of the aperture, (c) marking the A-memory as allocated and placing a copy of the A-data in the A-memory, (d) receiving a request to store a dataset Z-data in the aperture, the Z-data not including any data which is designated as critical data, (e) identifying a portion Z-memory of unallocated memory of the aperture, the Z-memory being large enough to hold the Z-data, the Z-memory having a physical address which is closer to the aperture last-to-flush end than any other physical address of any other unallocated memory of the aperture, (f) marking the Z-memory as allocated and placing a copy of the Z-data in the Z-memory;
   wherein the data preservation subsystem provides a higher likelihood of successfully flushing critical data and thereby preserving it than by storing data in the battery-backed memory without regard to data criticality.

2. The data preservation subsystem of claim 1, wherein the battery-backed memory aperture resides in or is controlled by a network node X, and the request to store A-data in the aperture was sent from a different network node Y.

3. The data preservation subsystem of claim 2, wherein the network node X includes a storage node in a cloud, and the network node Y includes a compute node in the cloud.

4. The data preservation subsystem of claim 2, wherein the network node X and the network node Y are related by a storage relationship R, where R is defined such that two nodes M and N are related by R when M stores data on behalf of N, and wherein R is not a one-to-one relationship of the network node X and the network node Y.

5. The data preservation subsystem of claim 1, wherein the battery-backed memory comprises NVDIMM memory.

6. The data preservation subsystem of claim 1, wherein the computing system comprises virtual machines, the dataset A-data is sent to the data preservation subsystem from a virtual machine VM-A, and the dataset Z-data is sent to the data preservation subsystem from a virtual machine VM-Z.

7. A method for data preservation in a computing system, the method comprising:
   receiving a request to store a dataset A-data in an aperture of a battery-backed memory, the memory including digital data storage locations addressed in a physical address space, the aperture including at least a portion of said digital data storage locations, the aperture having a physical address flush order which is an order of copying data from the aperture to an aperture-associated non-volatile storage in response to a data integrity threat, the flush order defining a first-to-flush physical address end of the aperture and a last-to-flush physical address end of the aperture, the A-data including data which is designated as critical data;

identifying a portion A-memory of unallocated memory of the aperture, the A-memory being large enough to hold the A-data, the A-memory having a physical address which is closer to the aperture first-to-flush physical address end than any other physical address of any other unallocated memory of the aperture;

marking the A-memory as allocated and placing a copy of the A-data in the A-memory;

receiving a request to store a dataset Z-data in the aperture, the Z-data not including any data which is designated as critical data;

identifying a portion Z-memory of unallocated memory of the aperture, the Z-memory being large enough to hold the Z-data, the Z-memory having a physical address which is closer to the aperture last-to-flush physical address end than any other physical address of any other unallocated memory of the aperture; and marking the Z-memory as allocated and placing a copy of the Z-data in the Z-memory;

whereby a likelihood of successfully flushing critical data and thereby preserving it is increased by placing the critical data ahead of non-critical data in the flush-order in the battery-backed memory.

8. The method of claim 7, further comprising at least one of the following:

determining a size of the aperture based at least in part on a battery characteristic of the battery-backed memory;

determining a location of the aperture based at least in part on a battery characteristic of the battery-backed memory;

resizing the aperture based at least in part on a change in a battery characteristic of the battery-backed memory; or moving the aperture based at least in part on a change in a battery characteristic of the battery-backed memory.

9. The method of claim 7, further comprising flush defragging at least a defrag portion of the aperture, the defrag portion including critical data.

10. The method of claim 7, further comprising designating at least a portion of the A-data as critical data based on at least one of the following criteria: a workload criticality, a virtual machine priority, or a customer status.

11. The method of claim 7, further comprising detecting the data integrity threat, flushing all of the critical data from the aperture to the non-volatile storage, and failing to flush at least some non-critical data from the aperture to the non-volatile storage.

12. The method of claim 7, further comprising detecting the data integrity threat, flushing at least all of the critical data from the aperture to the non-volatile storage, and then restoring all of the flushed data from the non-volatile storage into at least one of: a volatile memory, the battery-backed memory from which the data was flushed, or a different battery-backed memory than the battery-backed memory from which the data was flushed.

13. The method of claim 7, further comprising keeping at least one copy of the Z-data outside the aperture and outside the aperture-associated non-volatile storage.

14. The method of claim 7, wherein the battery-backed memory aperture resides in a physical machine denoted here as M and the request to store the A-data in the aperture was sent from a different physical machine denoted here as N.

15. The method of claim 7, comprising storing the A-data in only one storage node and storing copies of the Z-data in multiple storage nodes.

16. A computer-readable storage medium configured with data and instructions which upon execution cause a data preservation subsystem to perform a method for data preservation in a computing system, the method comprising:

receiving multiple requests, each request seeking storage of a respective dataset in an aperture of a battery-backed memory, the memory including digital data storage locations addressed in a physical address space, the aperture including at least a portion of said digital data storage locations, the aperture having a physical address flush order which is an order of copying data from the aperture to an aperture-associated non-volatile storage in response to a data integrity threat, the physical address flush order defining a first-to-flush physical address end of the aperture and a last-to-flush physical address end of the aperture, each respective dataset including data which is designated as critical data;

for at least two of the requests, identifying a respective portion of unallocated memory of the aperture, each portion of unallocated memory being large enough to hold the respective dataset, the identified respective portion of unallocated memory having a physical address which is closer to the aperture first-to-flush physical address end than any other physical address of any other unallocated memory of the aperture;

for at least one of the requests, marking the identified respective portion of unallocated memory as allocated and placing therein a copy of the respective dataset;

detecting the data integrity threat;

flushing all of the critical data which was copied into the aperture from the aperture to the non-volatile storage;

whereby the method preserves all of the critical data which was copied into the aperture, despite the data integrity threat.

17. The computer-readable storage medium of claim 16, wherein the method further comprises specifying at least one of an aperture size or an aperture address, and wherein said specifying is based on at least one of the following: a battery capacity, a battery age, or a battery reliability value.

18. The computer-readable storage medium of claim 16, wherein the flushing comprises executing firmware which has a unified extensible firmware interface.

19. The computer-readable storage medium of claim 16, wherein the method further comprises reserving at least ten percent of the aperture to hold data which is not designated as critical data.

20. The computer-readable storage medium of claim 16, wherein the method further comprises at least one of the following:

moving data which is not designated as critical data to a storage location outside the aperture in order to make space for data which is designated as critical data;

defragging at least a portion of the aperture, thereby reducing or eliminating an unallocated portion that was previously located between two allocated portions of the aperture.

* * * * *